Oct. 26, 1937.   M. J. RENQUIST ET AL   2,096,860
SELF GOVERNING PROPELLER FOR WIND DRIVEN DEVICES
Filed Jan. 10, 1936   2 Sheets-Sheet 2
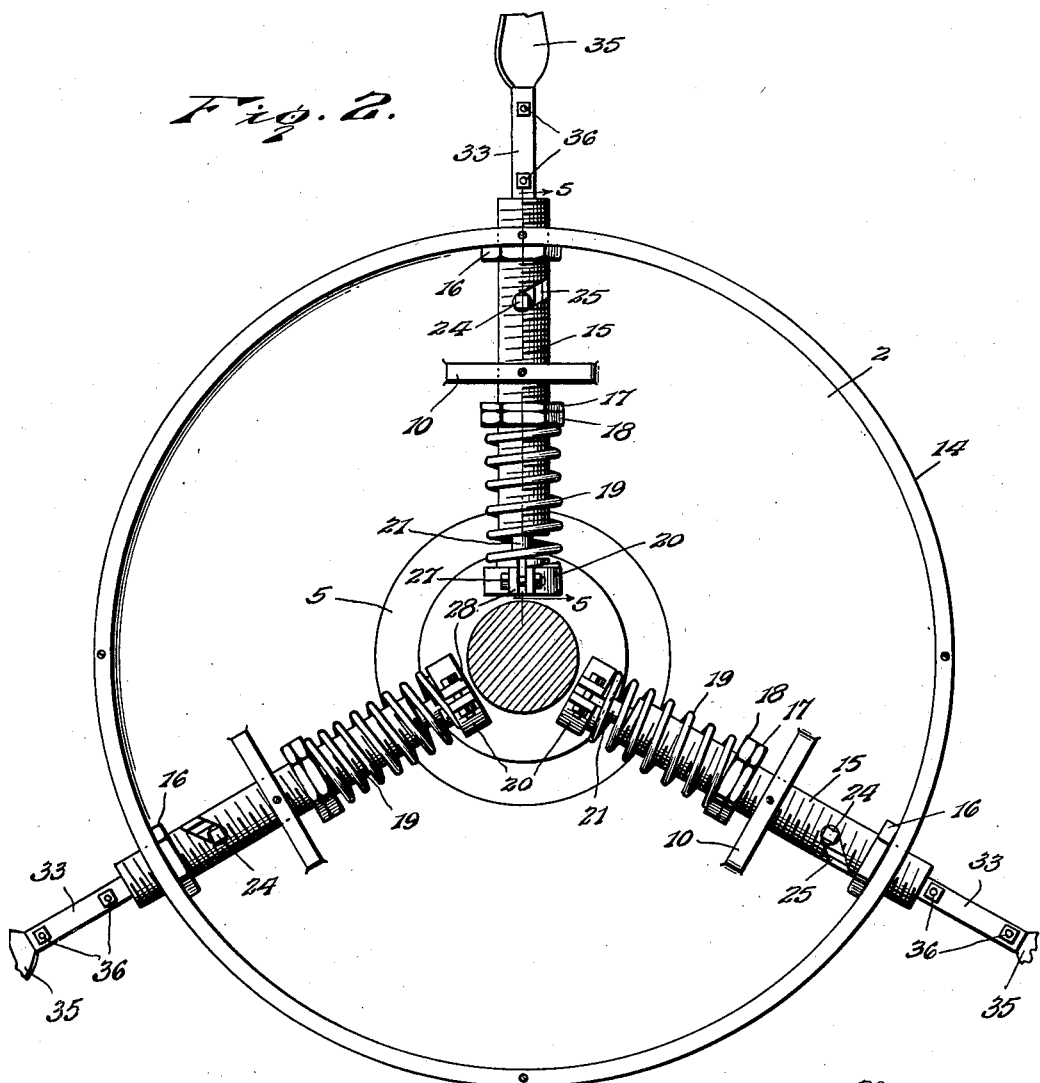
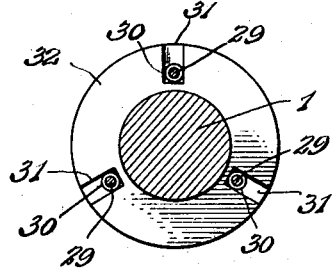
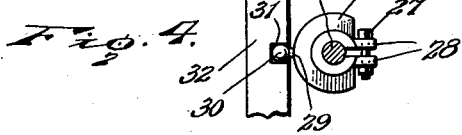
Inventor
M. J. Renquist.
H. C. Harden.
By Lacey & Lacey,
Attorneys Patented Oct. 26, 1937

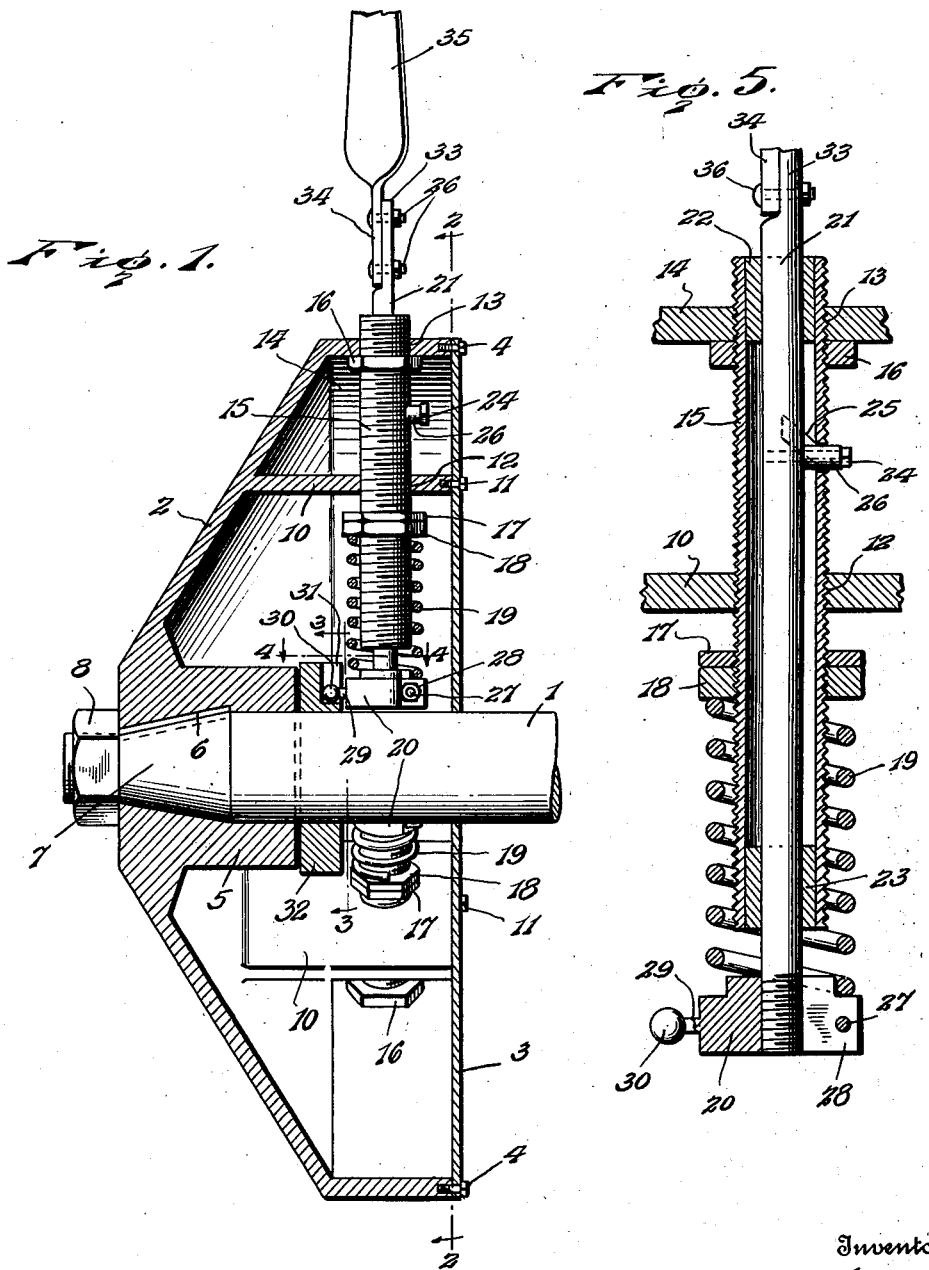

2,096,860

UNITED STATES PATENT OFFICE 2,096,860

SELF GOVERNING PROPELLER FOR WIND DRIVEN DEVICES

Mervin J. Renquist and Harold C. Harden, Deuel County, Nebr.

Application January 10, 1936, Serial No. 58,566

2 Claims. (Cl. 170—68)

This invention relates to a propeller for a wind driven device and more particularly to a propeller which is self adjusting and so constructed that the pitch of its blades may be automatically adjusted according to the velocity of the wind and the load applied to the propeller shaft.

One object of the invention is to so construct the propeller that the blades may be shifted radially of the hub of the propeller by centrifugal forces set up when the propeller is in motion and the blades turned during this radial movement to cause the blades to be disposed at the proper angle relative to the wind. Therefore, the blades will be automatically set in accordance with the velocity of the wind or load upon the propeller shaft and the most efficient operation obtained.

Another object of the invention is to provide improved means for slidably and turnably mounting the blade carrying arms of the propellers and, in addition, provide improved means for mounting helical springs which yieldably resist outward movement of the blade carrying arms.

Another object of the invention is to so mount the springs which resist outward movement of the blade carrying arms that initial tension of the springs may be regulated and thus the centrifugal force required to move them outwardly controlled.

The invention is illustrated in the accompanying drawings, wherein

Figure 1 is a sectional view taken diametrically through the improved propeller.

Figure 2 is a view taken along the line 2—2 of Figure 1.

Figure 3 is a fragmentary view taken along the line 3—3 of Figure 1 with the spring omitted.

Figure 4 is a fragmentary view taken through the inner end portion of one of the propeller arms along the line 4—4 of Figure 1.

Figure 5 is a sectional view upon an enlarged scale taken longitudinally of one of the propeller arms along the line 5—5 of Figure 2.

The improved propeller constituting the subject-matter of this invention is adapted to be mounted upon the shaft 1 constituting the main drive shaft of a windmill, generator or any other machine or apparatus in order that rotary motion may be imparted to the main shaft when the propeller is turned by air currents acting against blades of the propeller. While it has been stated that the shaft 1 constitutes the main shaft of the machine or apparatus to be driven it will be understood that mechanism of the machine or apparatus may be directly carried by the shaft or rotary motion transmitted from the shaft by gears, belts or in any other desired manner.

The hub 2 of the propeller may be formed as a hollow casting or in any other desired manner to form a hollow body defining a chamber which is open at its back and normally closed by a rear wall 3 which fits about the shaft 1 and has its marginal portions detachably secured against walls of the hub by bolts or equivalent fasteners 4. The hub tapers forwardly in order to reduce wind resistance and at its front end the hub carries an inwardly extending sleeve 5 which fits snugly about the forward end portion of the shaft and is held against rotation thereon by a key 6. It will thus be seen that when the hub is applied to the shaft, the key 6 driven into place in grooves formed in the sleeve 5 and the tapered end portion 7 of the shaft, and the nuts 8 applied and tightened, the hub will be very firmly secured upon the shaft and the shaft caused to rotate with the propeller. Fins or webs 10 extend rearwardly from the conical or tapered forward portion of the hub in spaced relation to each other circumferentially thereof with their rear ends terminating flush with the plane of the rear edge of the hub so that the bolts 11 may be passed through the closure plate or wall 3 and into the fins to assist in holding the closure plate in place. These fins have been shown three in number as the propeller has three blades but it is to be understood that any number of blades may be provided for the propeller in which case a corresponding number of fins will be provided. An opening 12 is formed through each fin in alinement with a companion opening 13 formed in the cylindrical rear portion of the hub and through these companion openings of the fins and hub extend tubes or sleeves 15 which are externally threaded and carry nuts 16, 17 and 18. The nuts 16 serve as adjustable means for limiting outward movement of the sleeves and the nuts 17 and 18 form adjustable abutments for the outer ends of helical springs 19 which fit loosely about inner end portions of the sleeves with their inner ends bearing against collars 20 clamped about inner ends of the propeller shafts or rods 21. These shafts or rods 21 extend longitudinally through the sleeves 15 with their end portions snugly received in bushings 22 and 23 mounted in ends of the sleeves and each propeller rod or shaft carries a side pin 24 which extends through a diagonally extending slot 25 formed in the companion sleeve. By this arrangement, the propeller rods or shafts may be shifted outwardly by centrifugal force in opposition to action of the springs 19 and during this movement the pins 24 which project through the spirally extending slots 25 will impart rotary motion to the propeller shaft. Rollers 26 are mounted upon the pins 24 to permit the pins to move easily through the slots and prevent frictional binding. By adjusting the nuts 17 and 18, initial tension of the springs 19 may be regulated and by adjusting the nuts 16, the extent to which the sleeves 17 project outwardly from the cylindrical portion of the hub may be controlled. The collars 20, which are tightly clamped about inner ends of the propeller shafts or rods 21 by bolts 27 passing through ears 28, carry pins 29 which project forwardly therefrom and terminate in spherical heads 30 engaged in radially extending slots 31 formed in the rear face of a collar 32 fitting about the main shaft 1 and loosely mounted thereon back of the sleeve 5 of the propeller. This collar serves as a mounting for inner ends of the propeller rods or shafts and as it is loose about the shaft 1, it may turn about the main shaft when the propeller shafts or rods are shifted radially. Therefore, the collar 32 will not interfere with turning of the propeller rods or shafts as they are shifted radially of the hub. Outer end portions of the propeller rods or shafts are flattened, as shown at 33, to provide flat faces against which the shank 34 of the propeller blades 35 may be firmly secured by bolts 36 and, therefore, the blades will be very firmly secured and extend at the pitch shown in Figure 1 when the propeller shafts or rods are in their retracted position. When, however, the propeller shafts are shifted outwardly by a centrifugal force and the propeller shafts turned, the blades will be turned with the shaft and pitch of the blades adjusted. It will thus be seen that when the propeller is in use and rotated by air currents, centrifugal force exerted will shift the propeller rods or shafts outwardly and adjust the pitch of the blades to dispose them at the proper angle according to the velocity of the wind. If the velocity of the wind increases and additional centrifugal force is exerted to further shift the propeller shafts outwardly or the velocity of the wind decreases to such an extent that the springs 19 will force the propeller shaft inwardly, the propeller shaft will be turned as they move longitudinally and pitch of the blades adjusted. This adjustment will also take place in case load upon the main shaft should be increased or reduced during operation of the machine or apparatus of which the main shaft forms an element and pitch of the blades adjusted.

Having thus described the invention, what is claimed as new is:

1. In a propeller construction, a rotary shaft, a hollow hub disposed about said shaft and having a mounting member at its center fixed to the hub, a collar loose about the shaft, and formed with radially extending grooves opening through the peripheral edge face of the collar and the rear side face thereof, tubes mounted radially in the hub rearwardly of said collar with their outer ends projecting therefrom, propeller blades extending radially from the hub, rods extending longitudinally through said tubes with their outer ends projecting therefrom and secured to the propeller blades and their inner ends projecting from the tubes, abutments carried by inner ends of said rods back of said collar and having lugs projecting forwardly and engaged in the tracks of said collar, abutments carried by the tubes externally thereof, springs about the tubes engaging the abutments carried by the tubes and the rods to yieldably resist outward movement of the rods, and means for imparting turning movement to the rods during longitudinal movement thereof and adjusting the angle of the propeller blades.

2. In a propeller structure, a rotary shaft, a hollow hub about the shaft having a marginal wall and a central sleeve fitting about the shaft and fixed thereto, a collar loose about said shaft directly back of said sleeve and formed with radially extending tracks in its rear face opening through the peripheral edge face of the collar, fins carried by said hub and spaced from each other circumferentially thereof, externally threaded tubes extending radially of the hub through openings in the fins and having their outer end portions extending through openings formed in the wall of the hub opposite the openings in the fins, propeller blades extending radially from the hub, rods extending longitudinally through the tubes with their outer end portions projecting from the tubes and secured to the propeller blades and their inner end portions threaded and projecting from inner ends of the tubes back of said collar, split nuts threaded upon inner ends of said rods and having forwardly extending pins engaged in the tracks of the collar loose about the shaft, bolts for binding said nuts upon said rods, abutments threaded upon the tubes between their inner ends and said fins for adjustment longitudinally upon the tubes, springs about the tubes having their outer ends bearing against the abutments of the tubes and their inner ends bearing against the nuts at inner ends of the rods and yieldably resisting outward movement of the rods, and pins carried by the rods and engaged through spirally extending slots formed in said tubes for imparting rotation to the rods and angularly adjust the propeller blades during longitudinal movement of the rods.

MERVIN J. RENQUIST.
HAROLD C. HARDEN.